(12) United States Patent
Simon

(10) Patent No.: US 6,502,501 B1
(45) Date of Patent: Jan. 7, 2003

(54) POULTRY COOKING APPARATUS

(76) Inventor: Thomas W. Simon, 588 Midland Rd., Bay City, MI (US) 48706

(*) Notice: Subject to any disclaimer, the term of this patent is extended or adjusted under 35 U.S.C. 154(b) by 0 days.

(21) Appl. No.: 10/167,521

(22) Filed: Jun. 11, 2002

(51) Int. Cl.[7] ............................. A23L 1/00; A47J 37/00; A47J 37/04; A47J 43/18
(52) U.S. Cl. ............................. 99/345; 99/347; 99/415; 99/417; 99/418; 99/419; 99/426; 99/446
(58) Field of Search .................. 99/345–347, 415–418, 99/419–421 V, 425, 426, 444–450, 400, 401; 426/523, 509–511

(56) References Cited

U.S. PATENT DOCUMENTS

| 495,821 A | | 4/1893 | Martin | |
|---|---|---|---|---|
| 532,729 A | | 1/1895 | Glassmeyer | |
| 1,485,253 A | * | 2/1924 | Devlin | 99/419 |
| 3,392,665 A | * | 7/1968 | Harnest | 99/419 |
| 4,633,773 A | * | 1/1987 | Jay | 99/426 |
| 4,709,626 A | * | 12/1987 | Hamlyn | 99/426 |
| 5,301,602 A | * | 4/1994 | Ryczek | 99/345 |
| 5,575,198 A | * | 11/1996 | Lowery | 99/426 |
| 5,893,320 A | * | 4/1999 | Demaree | 99/419 |
| 6,026,734 A | * | 2/2000 | Dadez | 99/345 |
| 6,062,131 A | * | 5/2000 | Holland | 99/345 |
| 6,119,585 A | | 9/2000 | Guidry | |
| 6,125,739 A | | 10/2000 | Jernigan | |
| 6,192,792 B1 | * | 2/2001 | Gremillion | 99/426 |

* cited by examiner

Primary Examiner—Timothy F. Simone
(74) Attorney, Agent, or Firm—Robert L. McKeller

(57) ABSTRACT

An apparatus for cooking poultry consists of a shallow pan, and a lid which covers the pan and which is provided with a centrally located opening. The lid supports an upwardly extending, hollow, perforated poultry-supporting tower on its upper surface. The detachable tower is mounted over the centrally located opening such that steam generated within the pan during cooking rises up into the tower, escapes through the perforations thereby infusing the poultry. The lid is also provided with at least one drain hole so that the drippings from the cooking poultry can be trapped within the pan, and re-infused into the poultry. The tower is detachable from the lid, and is interchangeable with alternative towers of differing lengths and circumferences to accommodate various sizes of poultry.

18 Claims, 4 Drawing Sheets

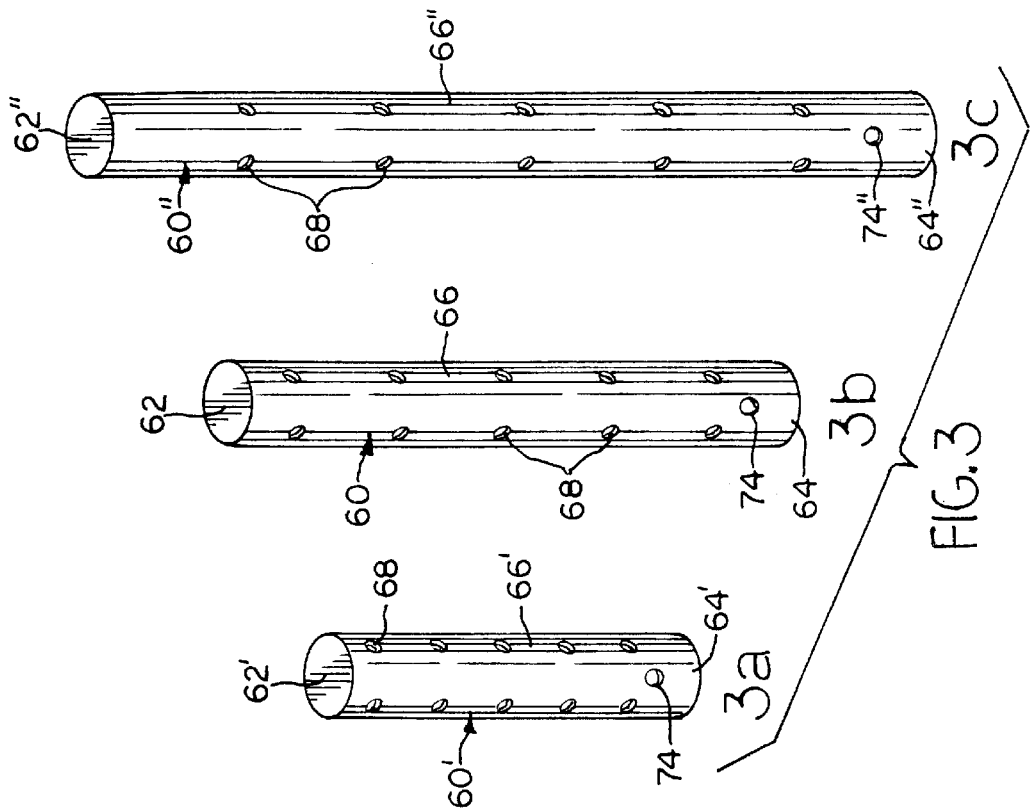
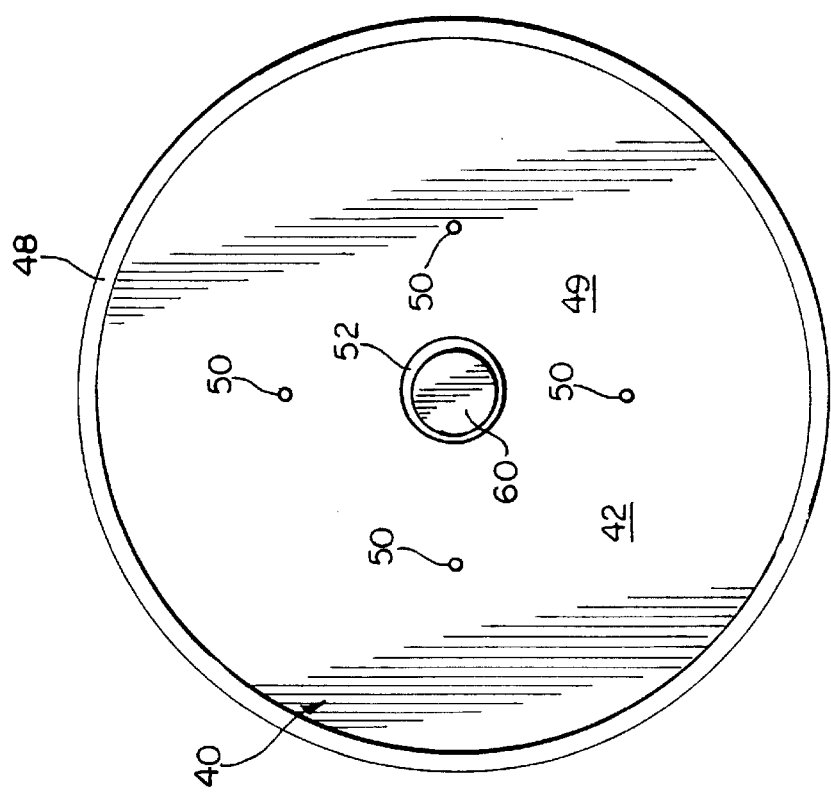

POULTRY COOKING APPARATUS

BACKGROUND OF THE INVENTION

Many devices exist for use in grilling, roasting, and/or smoking poultry. These devices can be elaborate, as typified by motorized rotisseries that employ doneness probes, and can also be extremely simple. A popular and very simple method of preparing poultry on a grill is commonly known as "beer can chicken" where an open can of beer is placed on a hot grill, and the chicken is placed on the beer can such that the beer can is inserted into the hollow body cavity of the chicken and the chicken is maintained in an upright position. The heat from the grill causes the beer in the can to steam and boil, marinating the interior of the chicken and providing a cooked chicken that is flavorful and moist.

Though simple and effective, there are many drawbacks to cooking poultry over a beer can. For example, the beer can-and-chicken combination is unstable. When a beer can-and-chicken combination topples, the chicken can become soiled or contaminated, and the spilled beer may extinguish the fire within the grill. Secondly, a beer can comes in only one size so that this cooking method will not work will small poultry such as Cornish hens, or with very large poultry such as turkeys. Thirdly, the exterior surface of a beer can has coatings including paint and other finishes which may be toxic when heated. Finally, the chicken (or other poultry product) is not protected from the heat source in any way so that the drippings from the chicken fall directly onto the heat source, causing localized flame-ups which can burn the outside of the chicken.

A need exists for a simple device which will allow cooking of raw, eviscerated poultry by grilling, roasting, and/or smoking while providing stability during the cooking process, allowing steam or juices to be infused into the internal cavity of the poultry, and protecting the exterior of the poultry from. intense heat and flames during the cooking process. The device will adjust in size to allow cooking of a variety of sizes of poultry, and will collect the juices of the cooking poultry for re-infusion into the cooking bird.

A wide variety of devices are shown in the prior art. U.S. Pat. No. 6,125,739 that issued to Jernigan on Oct. 3, 2000 shows a device for supporting and steaming fowl consisting of a hollow, perforated, frustoconical insert mounted to a circular base, where the insert is filled with liquid for steaming the interior of the fowl during cooking. U.S. Pat. No. 6,119,585 that issued to Guidry on Sep. 19, 2000 discloses a cooking apparatus suitable for grilling whole chickens on a grill, the apparatus comprising a vertically oriented cylinder mounted to a base plate. The chicken resides upon the cylinder when the base plate is resting on a grill. The use of a flavored liquid within the cylinder to enhance the taste of the chicken is described, as is the use of perforations in the base to allow drippings from the cooked food to reach the heat source. However, these patents do not disclose a means for collection of juices from the cooking fowl, and do not provide a means to compensate for various sized poultry. The U.S. Pat. No. 532,729 to Glassmeyer that issued on Jan. 15, 1895 discloses a cooking apparatus having an automatic baster including a cooking pan and rack. The U.S. Pat. No. 495,821 that issued to Martin on Apr. 18, 1893 discloses a dripping pan with a perforated top member. However, these patents do not disclose a perforated tower on which to mount poultry during cooking and which will allow internal infusion of the poultry with steam and juices during cooking.

SUMMARY OF THE INVENTION

An innovative apparatus for cooking poultry is described herein that will allow cooking of raw, eviscerated poultry by grilling, roasting, and/or smoking, both in a conventional oven and using an outdoor cooker such a grill or smoker. The innovative apparatus will provide stability during cooking, allow flavored or unflavored steam and poultry juices to be infused into the internal cavity of the poultry, and protect the exterior of the poultry from direct heat and flames during the cooking process. The apparatus will adjust in size to allow cooking of a variety of sizes of poultry, and will collect the juices of the cooking poultry for re-infusion into the cooking bird.

The apparatus consists of a shallow pan and a lid that covers the pan. The lid contains a centrally located opening. The lid supports an upwardly extending, hollow, perforated poultry-supporting tower on its upper surface. The tower is mounted over the centrally located opening such that steam generated within the pan during cooking rises up into the tower, escapes through the perforations thereby infusing the poultry. The lid is also provided with at least one drain hole so that the drippings from the cooking poultry can be trapped within the pan, and re-infused into the poultry. This feature also promotes a cleaner grill, cooker, or oven since the drippings are captured within the apparatus.

The tower is detachable from the lid, and is interchangeable with alternative towers of differing lengths having different circumferences. Thus, a relatively short tower, that may have a small circumference is detachably affixed to the lid for use in cooking small poultry such as Cornish hens, and can be replaced with a mid-length tower having a medium circumference for use in cooking medium sized poultry such as chicken or duck, and can be replaced with a long tower having a large circumference for use in cooking large poultry such as turkey or geese.

In use, the appropriate tower for the poultry being cooked is secured to the lid and the raw, eviscerated poultry is placed on the apparatus such that the tower extends into the body cavity of the poultry and the poultry is supported in a vertical position. A preferred liquid is placed within the interior of the pan and the pan is covered with the lid. The apparatus is placed on a grill or in an oven or smoker. The heat source causes the poultry to cook from the exterior in the conventional manner with the result that drippings fall onto the lid where they drain into the pan. The heat source simultaneously causes the liquid within the pan, including the drippings, to convert to steam. The steam escapes from the interior of the pan through the perforations of the tower, thereby infusing steam into the body of the poultry from the inside. The liquid may be non-flavored and be used to provide moist, tender cooked meat. The liquid may also be flavored or seasoned, and may include beer or wine, or a marinade. Use of a flavored liquid imparts a desired flavor to the moist and tender cooked meat.

BRIEF DESCRIPTION OF THE DRAWINGS

FIG. 2 is a top view of the poultry cooking apparatus, illustrating the central positioning of the tower on the lid, and drain holes between the tower and the periphery of the lid.

FIG. 3 is a perspective view of cylindrically shaped interchangeable towers, illustrating a Cornish hen sized tower (3A), a chicken sized tower (3B), and a turkey sized tower (3C).

DETAILED DESCRIPTION OF THE INVENTION

Figure 1:
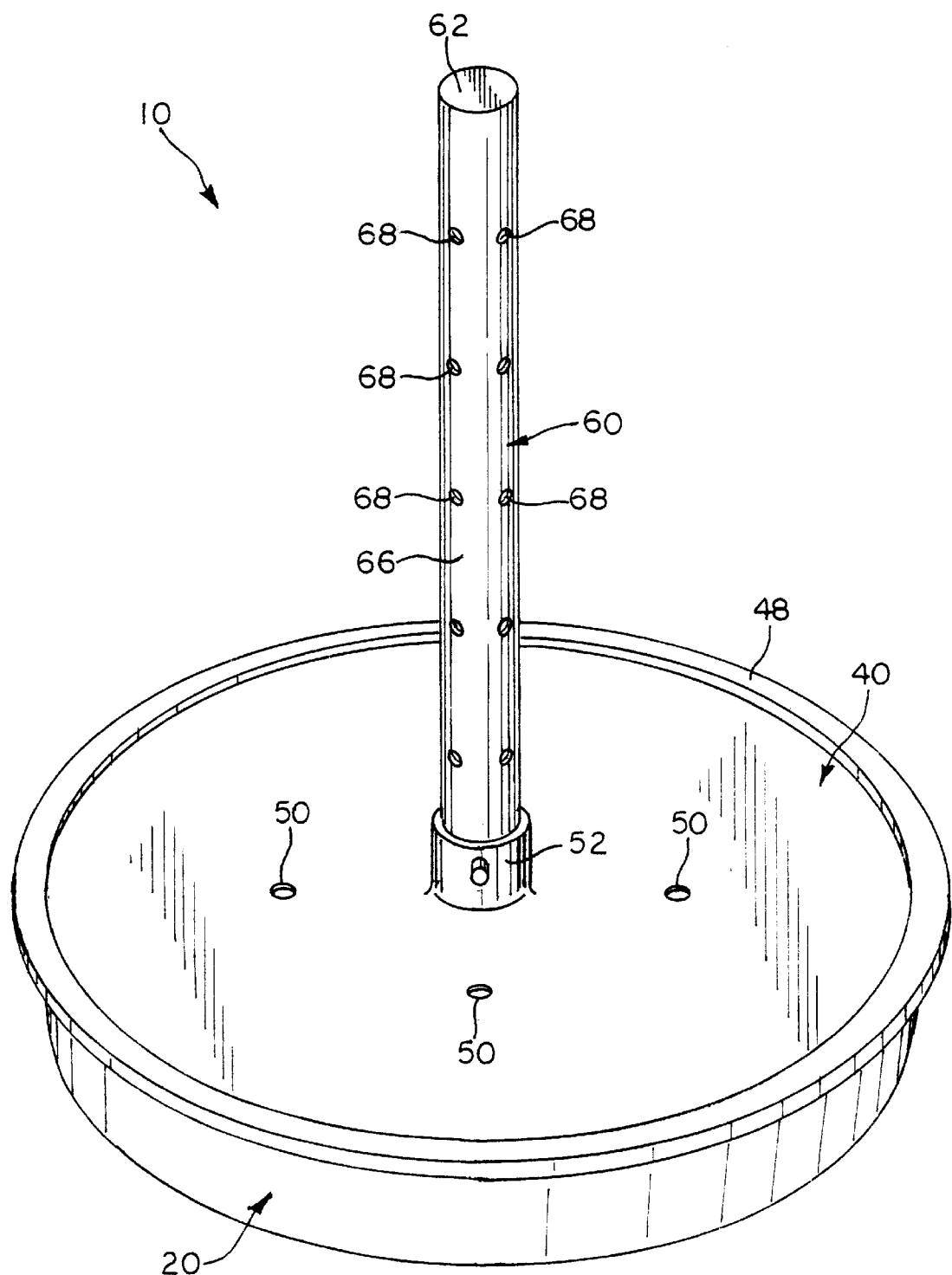
FIG. 1 is a perspective view of the preferred embodiment of the poultry cooking apparatus, illustrating the pan covered by the lid, the tower mounted to an upper surface of the lid, the tower having perforations about its side walls and a closed upper end.

The innovative poultry cooking device 10 will now be described with respect to the figures. Poultry cooking device 10 has three components. They are a pan 20, a removable lid 40, and a tower 60 for supporting poultry 5 in a vertical orientation above pan 20 and lid 40.

Figure 4:
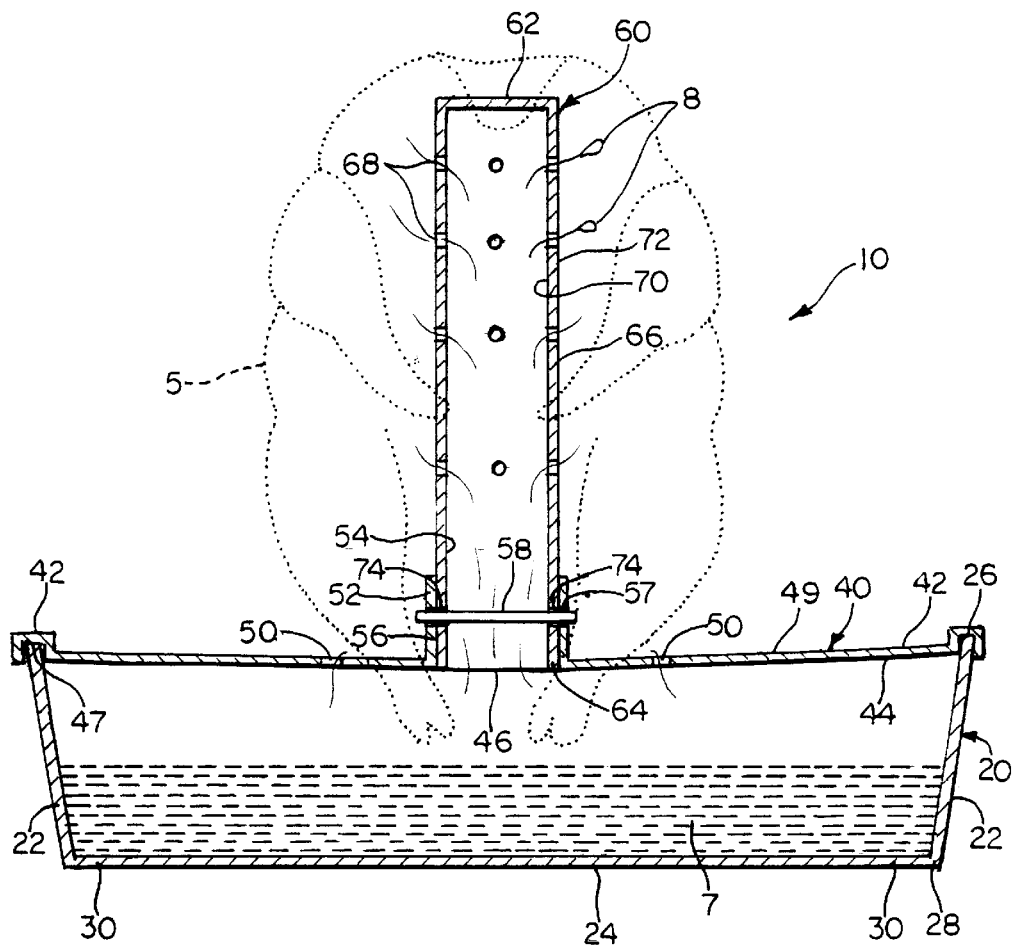
FIG. 4 is a side sectional view of the poultry cooking apparatus in use, illustrating a poultry mounted on a cylindrical tower, the tower residing within the internal body cavity of the poultry such that when the liquid within the pan boils, steam infuses the body of the poultry.

Pan 20 is has closed bottom 24 surrounded by side wall 22. Pan 20 is shallow such that the height of side wall 22 is much less than the diameter of bottom 24. In the preferred embodiment, pan 20 is generally cylindrical so that the peripheral edge 30 of bottom 24 is formed in the shape of a circle, with side wall 22 completely surrounding peripheral edge 30. Side wall 22 extends upwardly from bottom 24 such that lower edge of side wall 22 is integral with bottom 24. Side wall 22 may be normal to bottom 24 (FIG. 5), or may be angled slightly so that upper edge 26 of side wall 22 has a greater diameter than lower edge 28 of side wall 22 (FIGS. 1 and 4). It well within the scope of this invention, however, to form pan 20 with peripheral edge 30 of bottom 24 formed in a shape which includes, but is not limited to, a square or other polygonal shape.

Lid 40 is a generally flat plate having an upper surface 42 and a lower surface 44. Lid 40 has a peripheral edge 48 having the same shape as peripheral edge 30 of bottom 24. In use, peripheral edge 48 of lid 40 rests on upper edge 26 of side walls 22 such that lower surface 44 of lid 40 abuts and confronts side walls 22 and is removable therefrom. Peripheral edge 48 surrounds body portion 49 of lid 40. Lid 40 has a central opening 46 that is centered within body portion 49.

Flange or sleeve 52 surrounds central opening 46 and extends upwardly from upper face 42. Flange 52 is sized and shaped to receive tower 60 therein. In the preferred embodiment, central opening 46 is circular in shape so that flange 52 forms a short ring about this opening. It is well within the scope of this invention to provide central opening in alternative shapes to accommodate the shape of the periphery of tower 60. In the preferred embodiment, flange 52 is welded to lid 40, but may be secured to lid 40 by any conventional means or may be formed integrally with lid 40.

Flange 52 is provided with at least one, but preferably two, holes 57 through it. Holes 57 are located on opposing sides of flange 52 such they are horizontally aligned, and are sized and shaped to receive a pin 58 therein. Pin 58 is provided in a length that is greater than the diameter of flange 52 such that pin 58 can extend through both holes 57 simultaneously.

In the preferred embodiment, lid 40 is slightly convex such that peripheral edge 48 lies in a first plane, and body portion 49 lies in a second plane that lies below the first plane when lid 40 is resting on pan 20. Peripheral edge 48 may either be flat such that it lies in the horizontal plane (FIG. 5), or it may be folded downward so as to form a groove 47 in which to receive the upper edge 26 of side wall 22 (FIG. 4). The convexity of lid 40 prevents drippings from the cooking poultry from running off lid 40 over peripheral edge 48, and allows the drippings to be gathered in body portion 49. Body portion 49 is provided with at least 1, but preferably a plurality of small drain holes 50 which allow the drippings to be received within the internal space of pan 20. Drain holes 50 are much smaller in diameter than central opening 46, and provide the added benefit of allowing a small amount of steam to escape from body portion 49, thereby adding moisture and flavor to the exterior surface of the cooking poultry 5.

Tower 60 is an elongate hollow member having a closed first or upper end 62, an open second or lower end 64, and a mid portion 66 extending between upper end 62 and lower end 64. Upper end 62 is closed so that steam rising within tower 60 is directed horizontally toward the interior of the poultry, rather than escaping upwardly to no effect. Lower end 64 is open, and in use resides over the central opening 46 of lid 40, allowing steam to rise into the mid portion 66 of tower 60. Tower 60 has an inner surface 70, and an outer surface 72 which is opposed to inner surface 70 and which confronts the interior surfaces of poultry 5.

The outer diameter of tower 60 is sized to be received within flange 52 such that outer surface 72 of tower 60 confronts and abuts the inner surface 54 of flange 52. Mid portion 66 adjacent to second end 64 is provided with at least one, but preferably two, holes 74 therethrough. Holes 74 are located on opposing sides of tower 60 such they are horizontally aligned, and are sized and shaped to receive pin 58 therein.

Tower 60 is secured to flange 52 by alignment of flange holes 57 with tower holes 74, and simultaneous placement of pin 58 within each respective hole pair 57, 74. Pin 58 provides a means of releasably securing tower 60 to flange 52 so that in use tower 60 may be removed from lid 40 to be interchanged with a shorter tower 60' or longer tower 60" as appropriate for the size of poultry to be cooked.

Mid portion 66 of tower 60 is provided with a plurality of holes 68 therethrough. The holes 68 provide a means whereby steam 8 generated from liquid 7 within pan 20 may flow outward from the hollow interior of tower 60 and into the interior cavity of poultry 5. The holes 68 may be randomly positioned on mid portion 66, or placed thereon in a regular pattern so long as they provide sufficient steam flow in all portions of tower 60.

Figure 5:
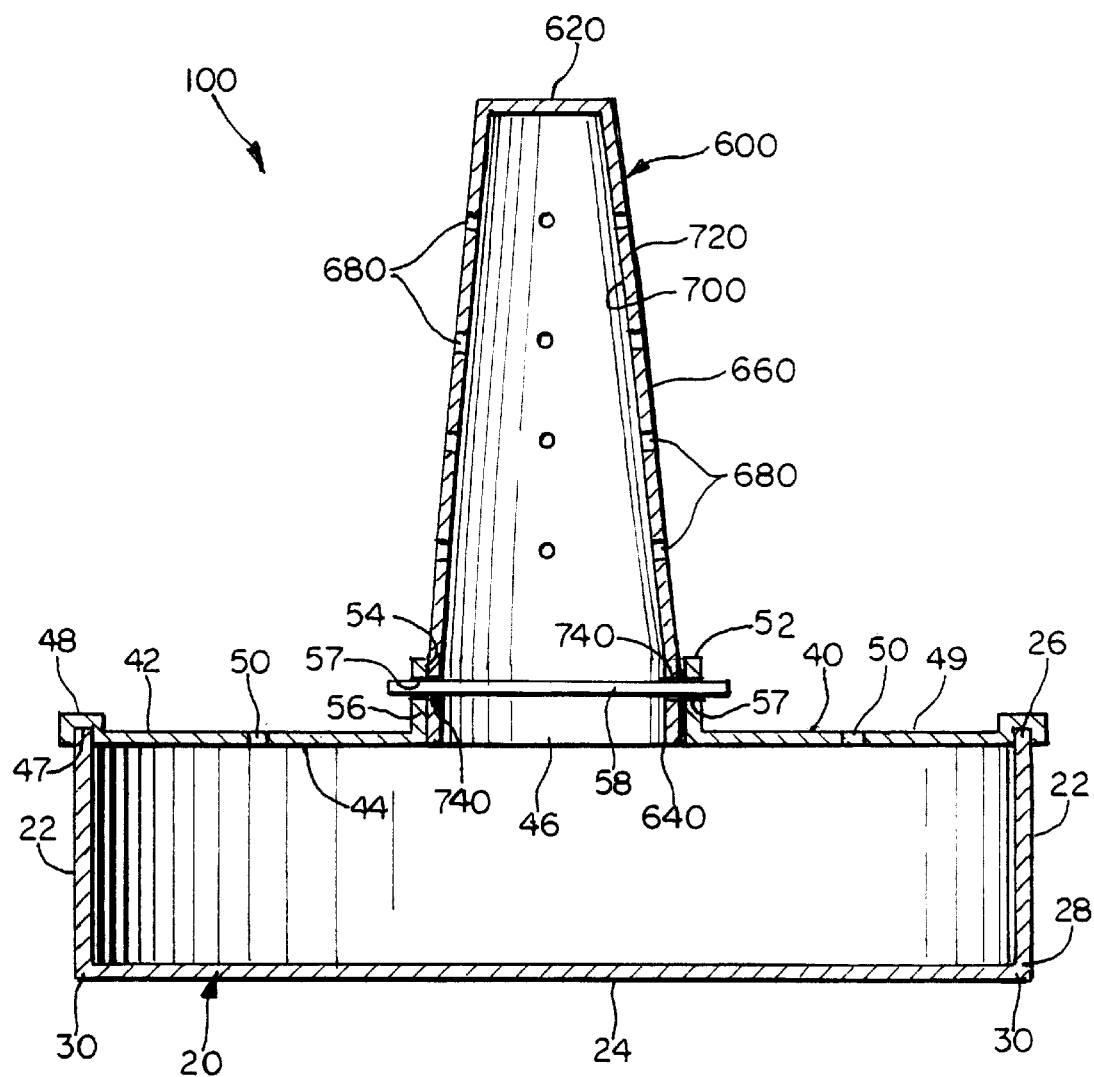
FIG. 5 is a side sectional view of the poultry cooking apparatus where a second embodiment of the tower is employed, illustrating a tower in the shape of a frustum.

In the preferred embodiment, tower 60 is cylindrical in shape (FIGS. 1–4). It is well within the scope of this invention, however, to form tower 60 in alternative elongate hollow shapes. FIG. 5 illustrates the second embodiment tower 600 formed in the shape of a frustum.

Tower 600 is provided with member having a closed first or upper end 620, an open second or lower end 640, and a mid portion 660 extending between upper end 620 and lower end 640. Upper end 620 of second embodiment tower 600 is of smaller diameter than lower end 640, providing a frustoconical shape that may more closely approximate the shape of the interior cavity of poultry 5. As in the preferred embodiment, upper end 620 is closed so that steam rising within tower 600 is directed horizontally toward the interior of the poultry, rather than escaping upwardly to no effect. Lower end 640 is open, and in use resides over the central opening 46 of lid 40, allowing steam to rise into the mid portion 660 of tower 600. Tower 600 has an inner surface 700, and an outer surface 720 which is opposed to inner surface 700 and which confronts the interior surfaces of poultry 5.

The outer diameter of tower 600 is sized to be received within flange 52 such that outer surface 720 of tower 600 confronts and abuts the inner surface 54 of flange 52. Mid portion 660 adjacent to second end 640 is provided with at least one, but preferably two, holes 740. The holes 740 are located on opposing sides of tower 600 such they are horizontally aligned, and are sized and shaped to receive pin 58 therein.

Tower 600 is secured to flange 52 by alignment of flange holes 57 with tower holes 740, and simultaneous placement of pin 58 within each respective hole pair 57, 740. Pin 58 provides a means of releasably securing tower 600 to flange 52 so that in use tower 600 may be removed from lid 40 to be interchanged with a shorter tower 600' (not shown) or longer tower 600" (not shown) as appropriate for the size of poultry to be cooked.

Mid portion 660 of tower 600 is provided with a plurality of holes 680. Holes 680 provide a means whereby steam 8 may flow outward from the hollow interior of tower 600 and into the interior cavity of poultry 5. Holes 680 may be randomly positioned on mid portion 660, or placed thereon in a regular pattern so long as they provide sufficient steam flow in all portions of tower 600.

In the preferred embodiment pan 60 and lid 40 are provided having diameters in the range of 9 to 12 inches, where a 9 inch diameter poultry cooking device 10 is suitable for cooking a chicken, and a 12 inch diameter poultry cooking device is suitable for cooking a turkey. Side walls 22 of pan 60 have an approximate height of 2 inches, and flange 52 has an approximate height of 1 inch. Tower 60 has an approximate outer diameter of 1 inch. The preferred length of tower 60 is approximately 8 inches, and may be provided in various lengths in the range of 5 to 12 inches to accommodate various poultry types and sizes.

Poultry cooking device 10 is preferably formed of a metal, preferably aluminum, because of its excellent heat transfer properties and tolerance of high temperatures. However, it is within the scope of this invention to use alternative materials that would be adequate for the purposes described, or to modify the metal by providing non-stick coatings or other improvements while maintaining the spirit of the inventive concept.

While I have shown and described the preferred embodiment of my invention, it will be understood that the invention may be embodied otherwise than as herein specifically illustrated and described, and that certain changes in the form and arrangements of parts and the specific manner of practicing the invention may be made within the underlying idea or principles of the invention within the scope of the appended claims.

What is claimed is:

1. An apparatus for cooking eviscerated, raw poultry comprising a poultry support and a device for introducing steam into the internal cavity of the poultry, wherein
    the poultry support comprises a vertically oriented tower,
    the device for introducing steam into the internal cavity of a poultry comprises a shallow pan and a removable lid,
    the shallow pan comprising side walls integral with a bottom,
    the removable lid comprising a generally flat plate having an upper face, a lower face opposed to the upper face, a peripheral edge, and a center which is surrounded by the peripheral edge and generally equidistant from the peripheral edge, the lid comprising a central opening concentric with the center, the lid further comprising a sleeve which surrounds the central opening and extends upwardly from the upper face, the sleeve sized and shaped to receive the tower therein,
    the peripheral edge of the lid resting on the side walls of the pan such that the lower face of the lid abuts and confronts the side walls.

2. The apparatus for cooking as claimed in claim 1 wherein the tower comprises an elongate hollow member having a closed first end, an open second end, and a mid portion extending between the first end and the second end, the elongate hollow member having an inner surface and an outer surface, the second end of the elongate hollow member comprising an outer diameter which is sized to be received within the sleeve such that the outer surface of the tower confronts and abuts the inner surface of the sleeve, the second end of the elongate hollow member comprising a first pin hole forming a hole therethrough from the outer surface of the elongate hollow member to the inner surface of elongate hollow member, the sleeve comprising a second pin hole forming a hole therethrough from the outer surface of the sleeve to the inner surface of the sleeve, the poultry support means further comprising a pin, wherein when the tower is positioned within the sleeve such that the first pin hole is in alignment with the second pin hole, the pin is fittingly and concurrently received within both the first pin hole and the second pin hole so as to maintain and support the tower in a nested position within the sleeve.

3. The apparatus as claimed in claim 2 wherein the mid portion of the tower comprises a plurality of holes through it, the holes providing an access whereby steam may flow from the hollow interior of the tower to the exterior of the tower such that the interior cavity of any poultry placed thereon is steamed.

4. The apparatus as claimed in claim 3 wherein the elongate hollow member is cylindrical in shape.

5. The apparatus as claimed in claim 3 wherein the elongate hollow member is formed in the shape of a frustum such that the first end has a smaller diameter than the second end.

6. The apparatus as claimed in claim 1 wherein the lid further comprises at least two drain openings positioned between the sleeve and the peripheral edge, the drain openings being smaller in size than the central opening, the drain openings extending between the upper face and the lower face such that they allow fluids to drain through the lid and into the pan.

7. A poultry cooking device comprising a pan, a pan lid, and a tower wherein
    the pan comprises a short, hollow, generally cylindrical body having a closed bottom, side walls, and an open top end, the pan having a predetermined diameter;
    the pan lid comprises a generally thin, flat plate sized and shaped to completely cover the open top end of the pan, the pan lid having a peripheral edge and a central opening, the pan lid being separable and removable from the pan;
    the central opening being surrounded by an upwardly extending flange;
    the flange extending upward in a direction which is generally normal to the pan lid, the flange having an inner surface and an outer surface;
    the tower comprising an elongate hollow, generally cylindrical body having a closed top end, side walls, and an open bottom, the tower having a predetermined diameter, wherein the tower diameter is smaller than the diameter of the pan, the tower having an inner surface and an outer surface;
    the open bottom end of the tower is sized and, shaped to fit within the flange such that the outer surface of the tower abuts and confronts the inner surface of the flange;

the tower is maintained within the flange using at least one tower securement means.

8. The poultry cooking device as claimed in claim 7 wherein the side walls of the tower are provided with a plurality of perforations to allow fluid communication between the hollow interior space within the tower and the exterior of the tower.

9. The poultry cooking device as claimed in claim 8 wherein the pan lid is provided with at least one drain hole positioned between the central opening and the peripheral edge of the pan lid.

10. The poultry cooking device as claimed in claim 9 wherein the pan lid is concave such that the peripheral edge of the pan lid resides in a first plane and the central opening resides in a second plane, such that when in use on the pan, the first plane lies above the second plane.

11. The poultry cooking device as claimed in claim 9 wherein the tower securement comprises a pin, a first pin hole in the sidewall of the tower adjacent to the open bottom, and a second pin hole in the flange, wherein when the tower is positioned within the flange such that the first pin hole is aligned with the second pin hole, the pin is placed within both first pin hole and the second pin hole so as to maintain the relative positions of the tower and the flange.

12. A cooking apparatus for steaming poultry using a seasoning liquid, the cooking apparatus comprising a pan, a lid, and a tower, wherein the pan is used for receiving the seasoning liquid therein, the lid is used for covering the pan, the lid containing a central opening therein, the tower having a central longitudinal axis and the tower sized to be inserted into the internal cavity of poultry so as to support the poultry over the pan, the tower mounted to an upper surface of the pan lid such that it is aligned along the central longitudinal axis with the central opening, the tower comprising a plurality of holes therethrough to allow steam from the pan to infuse the internal cavity of the poultry.

13. The cooking apparatus as claimed in claim 12 wherein the tower is cylindrical.

14. The cooking apparatus as claimed in claim 12 wherein the tower is formed in the shape of a frustum such that the wide end of the frustum abuts the pan lid, and the narrow end of the frustum is spaced apart from the pan lid.

15. The cooking apparatus as claimed in claim 12 wherein the tower comprises a first end, a mid portion and a second end which is separated from the first end by the mid portion, wherein the second end of the tower is open and abuts the pan lid, the plurality of holes therethrough are randomly placed about the mid portion, and the first end is closed.

16. The cooking apparatus as claimed in claim 15 wherein the pan lid is provided with at least one drain hole therein for allowing drippings from a poultry to drain into the pan.

17. The cooking apparatus of claim 16 wherein the pan lid comprises a peripheral edge, the pan lid being concave such that the central opening lies below the peripheral edge when the pan lid is in place upon the pan.

18. An apparatus for cooking eviscerated, raw poultry comprising a poultry support and a device for introducing steam into the internal cavity of the poultry, wherein the poultry support comprises a vertically oriented tower, the device for introducing steam into the internal cavity of a poultry comprises a shallow pan and a removable lid, the shallow pan comprising side walls integral with a bottom, the removable lid comprising a generally flat plate having an upper face, a lower face opposed to the upper face, a peripheral edge, and a center which is surrounded by the peripheral edge and generally equidistant from the peripheral edge, the lid comprising a central opening concentric with the center, the peripheral edge of the lid resting on the side walls of the pan such that the lower face of the lid abuts and confronts the side walls, the vertically oriented tower being fixed integrally with the removable lid and directly over the central opening in the removable lid.

* * * * *